United States Patent
Moudgill et al.

(10) Patent No.: US 12,050,910 B2
(45) Date of Patent: Jul. 30, 2024

(54) DEVICE AND METHOD FOR HARDWARE-EFFICIENT ADAPTIVE CALCULATION OF FLOATING-POINT TRIGONOMETRIC FUNCTIONS USING COORDINATE ROTATE DIGITAL COMPUTER (CORDIC)

(71) Applicant: Optimum Semiconductor Technologies Inc., Tarrytown, NY (US)

(72) Inventors: Mayan Moudgill, Chappagua, NY (US); Pablo Balzola, Madrid (ES); Murugappan Senthivelan, Fanwood, NJ (US); Vaidyanathan Ramdurai, Tarrytown, NY (US); Sitij Agrawal, Tarrytown, NY (US)

( * ) Notice: Subject to any disclaimer, the term of this patent is extended or adjusted under 35 U.S.C. 154(b) by 120 days.

(21) Appl. No.: 17/427,832

(22) PCT Filed: Feb. 20, 2020

(86) PCT No.: PCT/US2020/018975
§ 371 (c)(1),
(2) Date: Aug. 2, 2021

(87) PCT Pub. No.: WO2020/172368
PCT Pub. Date: Aug. 27, 2020

(65) Prior Publication Data
US 2022/0137925 A1 May 5, 2022

Related U.S. Application Data

(60) Provisional application No. 62/807,852, filed on Feb. 20, 2019.

(51) Int. Cl.
*G06F 9/30* (2018.01)
*G06F 5/01* (2006.01)
(Continued)

(52) U.S. Cl.
CPC .......... *G06F 9/3001* (2013.01); *G06F 7/5446* (2013.01); *G06F 7/548* (2013.01);
(Continued)

(58) Field of Classification Search
CPC ...... G06F 7/548; G06F 7/5446; G06F 9/3001; G06F 9/3013; G06F 5/01; G06F 17/17
See application file for complete search history.

(56) References Cited

U.S. PATENT DOCUMENTS

| 4,896,287 A | 1/1990 | O'Donnell et al. |
| 5,134,578 A | 7/1992 | Garverick et al. |

(Continued)

FOREIGN PATENT DOCUMENTS

CA   2255223 A1   6/2000

OTHER PUBLICATIONS

J.L. Hennessy et al., Computer Architecture, A Quantitative Approach, Elsevier Science, 2003 (Year: 2003).*

(Continued)

*Primary Examiner* — Emily E Larocque
(74) *Attorney, Agent, or Firm* — Zhong Law LLC

(57) ABSTRACT

A system and an accelerator circuit including a register file comprising instruction registers to store a trigonometric calculation instruction for evaluating a trigonometric function, and data registers comprising a first data register to store a floating-point input value associated with the trigonometric calculation instruction. The accelerator circuit further includes a determination circuit to identify the trigonometric calculation function and the floating-point input value associated with the trigonometric calculation instruction and determine whether the floating-point input value is in a small value range, and an approximation circuit to responsive to determining that the floating-point input value is in the small value, receive the floating-point input value and calculate an
(Continued)

approximation of the trigonometric function with respect to the input value.

13 Claims, 3 Drawing Sheets

(51) Int. Cl.
  *G06F 7/544* (2006.01)
  *G06F 7/548* (2006.01)
  *G06F 17/17* (2006.01)

(52) U.S. Cl.
  CPC ............ *G06F 9/3013* (2013.01); *G06F 17/17* (2013.01); *G06F 5/01* (2013.01)

(56) References Cited

U.S. PATENT DOCUMENTS

| | | | |
|---|---|---|---|
| 6,385,632 | B1 | 5/2002 | Choe et al. |
| 8,510,354 | B1 | 8/2013 | Langhammer |
| 8,572,150 | B1 | 10/2013 | Dick |
| 10,168,992 | B1 | 1/2019 | Pillai et al. |
| 2006/0282489 | A1 | 12/2006 | Khan et al. |
| 2011/0119520 | A1 | 5/2011 | Khan et al. |
| 2011/0320513 | A1 | 12/2011 | Langhammer |
| 2012/0089807 | A1 | 4/2012 | Rupley |
| 2018/0321910 | A1 | 11/2018 | Langhammer et al. |

OTHER PUBLICATIONS

S.F. Hsiao et al., Efficient Designs of Flaoting-Point CORDIC Rotation and Vectoring Operations, IEEE 2008 (Year: 2008).*
International Application No. PCT/US2020/018975, International Search Report and Written Opinion mailed Jun. 15, 2021, 15 pages.
Meher et al., "50 Years of CORDIC: Algorithms, Architectures, and Applications", IEEE Transactions on Circuits and Systems, vol. 56, No. 9, 2009, pp. 1893-1907.
International Application No. PCT/US2020/018976, International Search Report and Written Opinion mailed May 7, 2021, 12 pages.
Chinese Search Report issued in CN Application No. 202080028532. X, mailed Jul. 26, 2023, 3 pages.
Chinese Search Report issued in CN Application No. 2020800287147, mailed Aug. 19, 2023, 3 pages.
Pramod K. Meher, "50 Years of CORDIC: Algorithms, Architectures, and Applications," pub. date: Sep. 2009.
European Search Report issued in EU Application No, 20759868, mailed Dec. 14, 2022, 9 pages.
Milos D. Ercegovac, REFEREX, Jan. 2004 (Jan. 1, 2004), XP040426237.
Alvaro Vazquez, "Implementation of the Exponential Function in a Floating-Point Unit," pub. date: Nov. 3, 2000.
US Non Final Office Action issued in U.S. Appl. No. 17/427,843 mailed Apr. 27, 2023, 25 pages.
Chinese 1st Office Action issued in CN Application No. 202080028532.X mailed Jul. 29, 2023.
Chinese 1st Office Action issued in CN Application No. 202080028714.7 mailed Aug. 24, 2023.
European Search Report issued in EU Application No. 20760098.2, mailed Oct. 18, 2022, 8 pages.

* cited by examiner

DEVICE AND METHOD FOR HARDWARE-EFFICIENT ADAPTIVE CALCULATION OF FLOATING-POINT TRIGONOMETRIC FUNCTIONS USING COORDINATE ROTATE DIGITAL COMPUTER (CORDIC)

CROSS-REFERENCE TO RELATED APPLICATIONS

This application is a national stage application of PCT/US2020/018975 filed Feb. 20, 2020, which claims priority to U.S. provisional application 62/807,852 filed Feb. 20, 2019. The contents of above-identified applications are hereby incorporated by reference in their entireties.

TECHNICAL FIELD

The present disclosure relates to circuits and methods for implementing trigonometric functions, and in particular to circuits and methods for hardware-efficient adaptive calculation of floating-point trigonometric functions using coordinate rotate digital computer (CORDIC).

BACKGROUND

An accelerator circuit such as a graphical processing unit (GPU) may include circuits configured to perform the calculations of numerical functions. The numerical functions may convert one or more input values into one or more output values according to certain mathematical relations defined by the numerical functions. Examples of the numerical functions may include trigonometric functions that are widely used in practical applications such as image processing and machine learning.

The types of operators used to carry out the calculations of the numerical functions determine the complexity of circuits implementing these numerical functions and the time needed to perform these calculations. It is known that the circuit implementation of a multiplication operator is much more complex compared to the circuit implementation of a shift operator or an addition operator. Thus, circuits with small footprint integrated circuits (e.g., small-footprint field-programmable gate array (FPGA) circuits) often do not support direct calculation of a multiplication operator. For such applications, the coordinate rotation digital computer (CORDIC) algorithm is employed to perform calculations of a wide range of numerical functions. The CORDIC algorithm uses rotations rather than multiplications to perform the calculations, thus significantly reducing the complexity of the hardware circuit implementing these numerical functions.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Figure 1:
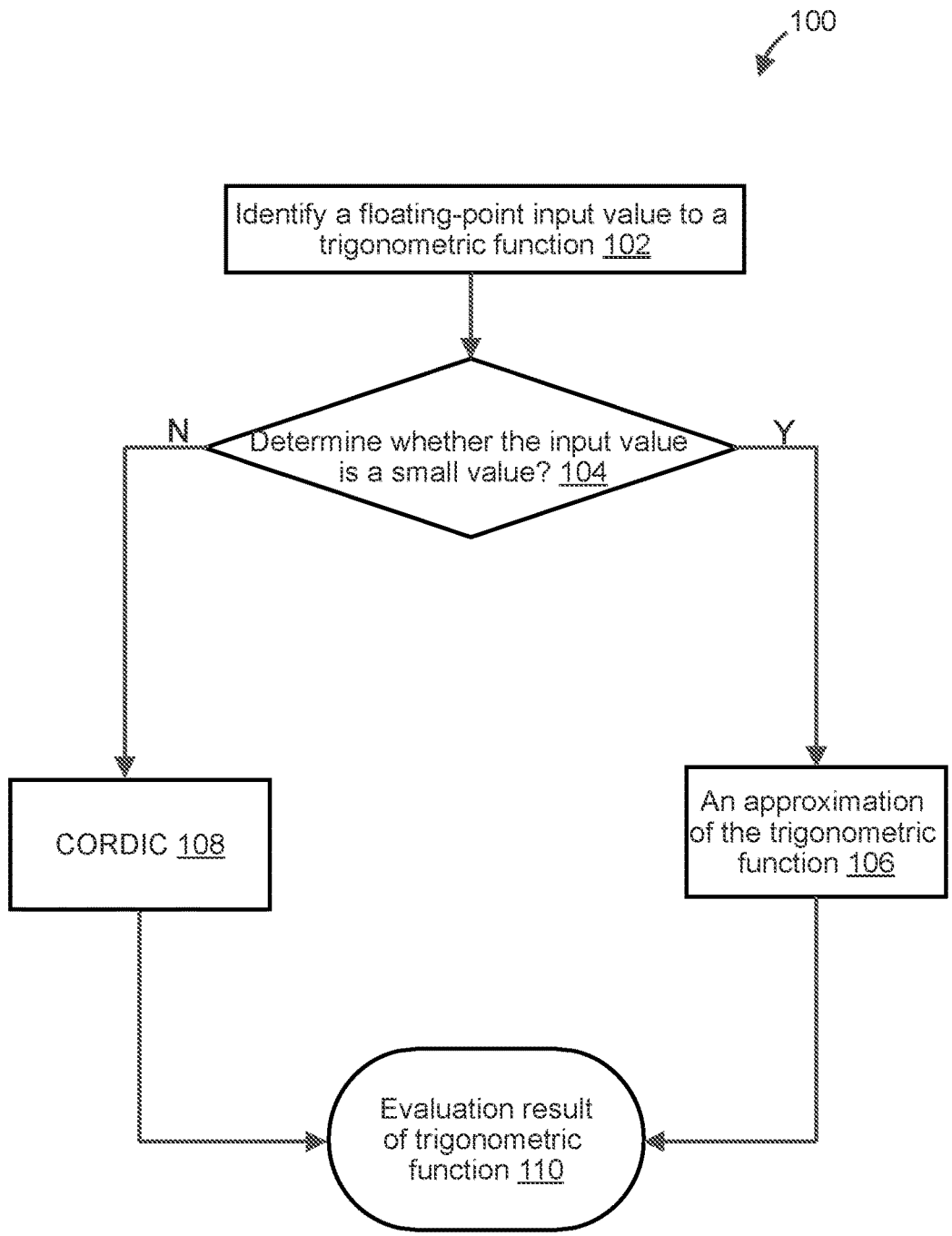
FIG. 1 illustrates a flow diagram of a method for adaptively calculating a trigonometric function according to an implementation of the disclosure.

The CORDIC algorithms as described in the disclosure are developed to compute trigonometric functions for fixed-point input values. The CORDIC algorithms employ a series of iterative steps of rotations to approximate the trigonometric functions with respect to one or more input values. The trigonometric functions may include sin x, cos x, $\sin^{-1}$ x (or arcsin(x)), $\cos^{-1}$ x (or arccos(x)), $\tan^{-1}$ x (or arctan(x)) etc. Because each iterative step of the CORDIC algorithms involves rotation calculations without invoking multiplication calculations, the circuit supporting implementations of the CORDIC algorithms can be much simpler and can be realized in a small circuit footprint (i.e., small circuit areas) implemented on a FPGA circuit board.

The input values such as a real number can be represented as fix-pointed numbers or floating-point numbers when calculating the trigonometric functions. Current implementations of the CORDIC algorithms are primarily for fix-pointed input values. In computing, a fixed-point number representation of a real number includes a first fixed number of bits for representing the integer portion of the real number and a second fixed number of bits for the representing the fractional portion of the real number. A n-bit (binary) point number can be thought of as an n-bit integer divided by a scale factor, $2^m$. This is equivalent to treating the number as though there were a radix-point between bits m and m−1. The diagram below assumes an 8-bit number with a scale factor of $2^5$, so the radix point is between bits 5 and 4.

| 7 | 6 | 5 • 4 | 3 | 2 | 1 | 0 |
|---|---|---|---|---|---|---|

In this case, the bit-pattern 0101_1001 is interpreted as the real number $$\frac{89}{32} = 2\frac{19}{32} = 2.59375.$$

Fixed-point numbers usually represent negative numbers the same way as integers deal with signed numbers, using 2's complement representation, instead of an explicit sign bit.

The floating-point number representation of a real number includes a sign bit, a fixed number of bits representing significant digits (or significand), and an exponent for scaling the significand. For example, in the IEEE floating-point number representation, a real number is represented as ±1.m*$2^{exp}$, where the mantissa 1.m is a number in the range (1.0 . . . 2.0], with fraction m of some fixed number of bits where the number of bits is implementation-dependent. The exponent exp is an integer in a range that is also implementation-dependent. A sign bit is used to indicate the sign (+ or −). In the case of IEEE single precision floating-point, 23 bits are used for the fractional part, m. The exponent exp has range 127 to −126. IEEE floating-point number representation also includes representations of special cases such as denormals and infinities.

The CORDIC algorithm uses rotations rather than multiplications in calculating trigonometric functions, allowing for efficient hardware implementations of calculations of trigonometric functions. Using the calculations of sine (i.e., sin( )) and cosine (i.e., cos( )) functions as an example, the CORDIC algorithm is to compute trigonometric functions sin x and cos x by repeatedly applying the identities $$\sin(x+y)=\sin(x)\cos(y)+\cos(x)\sin(y)$$

$$\cos(x+y)=\cos(x)\cos(y)-\sin(x)\sin(y)$$

The above equations can be rewritten as:

$$\sin(x+y)=\cos(y)[\sin(x)+\tan(y)\cos(x)]$$

$$\cos(x+y)=\cos(y)[\cos(x)-\tan(y)\sin(x)]$$

Choosing $x=\theta_i=\tan^{-1}(2^{-i})$, the above equations can be written as $$\sin(\theta_i+y)=\cos(\theta_i)[\sin(y)+\tan(\theta_i)\cos(y)]$$

$$\cos(\theta_i+y)=\cos(\theta_i)[\cos(y)-\tan(\theta_i)\sin(y)]$$

which can be expanded to:

$$\sin(\theta_i+y)=\cos(\theta_i)[\sin(y)+\cos(y)/2^i]$$

$$\cos(\theta_i+y)=\cos(\theta_i)[\cos(y)-\sin(y)/2^i]$$

where the division by $2^i$ can be implemented (for fixed-point) in hardware as a right shift by i times.

A given input angle $\alpha$ can be approximated in the first quadrant as $\alpha_n=\Sigma_{i=0}^{n}\delta_i\theta_i$, where $\delta_i=\pm 1$. The accuracy of the approximation is determined by the number of terms, n. Given an a, the trigonometric function values $\sin\alpha_n$ and $\cos\alpha_n$ can be calculated using the following steps:

$$\sin(\theta_0)=\text{The CORDIC algorithms}$$

$$\cos(\theta_0)=1/\sqrt{2}$$

$$\sin(\delta_1\theta_1+\theta_0)=\cos(\theta_1)[\sin(\theta_0)+\delta_1\cos(\theta_0)/2^1]$$

$$\cos(\delta_1\theta_1+\theta_0)=\cos(\theta_1)[\cos(\theta_0)-\delta_1\sin(\theta_0)/2^1]$$

$$\sin(\delta_2\theta_2+\delta_1\theta_1+\theta_0)=\cos(\theta_2)[\sin(\delta_1\theta_1+\theta_0)+\delta_2\cos(\delta_1\theta_1+\theta_0)/2^2]$$

$$\cos(\delta_2\theta_2+\delta_1\theta_1+\theta_0)=\cos(\theta_2)[\cos(\delta_1\theta_1+\theta_0)-\delta_2\sin(\delta_1\theta_1+\theta_0)/2^2]$$

These formulae can be generalized as the following recurrence:

$$\sin(\delta_i\theta_i+\delta_{i-1}\theta_{i-1}+\ldots+\theta_0)=\cos(\theta_i)[\sin(\delta_{i-1}\theta_{i-1}+\ldots+\theta_0)+\delta_i\cos(\delta_{i-1}\theta_{i-1}+\ldots+\theta_0)/2^i]$$

$$\cos(\delta_i\theta_i+\delta_{i-1}\theta_{i-1}+\ldots+\theta_0)=\cos(\theta_i)[\cos(\delta_{i-1}\theta_{i-1}+\ldots+\theta_0)+\delta_i\sin(\delta_{i-1}\theta_{i-1}+\ldots+\theta_0)/2^i]$$

Note that the calculation of this sequence includes a multiplication by $\cos(\theta_i)$ at each step. This can be avoided by recognizing that these multiplications can be factored out so that there is a single multiplication by the product $K_n=\Pi_{i=0}^{n}\cos(\theta_i)$. To take advantage of this fact, the recurrence can be rewritten so that:

$$X_0=1/\sqrt{2}$$

$$Y_0=1/\sqrt{2}$$

$$X_i=X_{i-1}+\delta_i Y_{i-1}/2^i$$

$$Y_i=Y_{i-1}+\delta_i X_{i-1}/2^i$$

The $\sin\alpha_n$ and $\cos\alpha_n$ can be recovered by multiplying at the end with $K_n$ so $$\sin(\alpha_i)=K_i X_i$$

$$\cos(\alpha_i)=K_i Y_i$$

If n can be predetermined based on the accuracy of the approximation to $\alpha$, then the final multiplication with $K_n$ can be avoided by instead pre-multiplying with $K_n$. This is equivalent to initializing $X_0$ and $Y_0$ with $K_n$. So, $$X_0=K_n/\sqrt{2}$$

$$Y_0=K_n/\sqrt{2}$$

$$\sin(\alpha_n)=X_n$$

$$\cos(\alpha_n)=Y_n$$

Given an angle $\alpha$ for computing $\sin(\alpha)$ or $\cos(\alpha)$, the CORDIC algorithm includes the calculation of the $\delta_i$ at each step i such that eventual $\alpha_n$ can best approximate $\alpha$. The standard approach is to pick + or − based on whether the current approximation $\alpha_i$ is less than $\alpha$ or not.

The pseudo code for the calculation of sin and/or cos using CORDIC is:

```
sincos(A)
  Y=0
  X=K_n
  Ai=0
  for(i=0; i<n; i++)
    if(Ai<A)
      Y'=Y+(X»i)
      X'=X-(Y»i)
      Ai=Ai+theta[i]
    else
      Y'=Y-(X»i)
      X'=X+(Y»i)
      Ai=Ai-theta[i]
    Y=Y'
    X=X'
  return (Y,X)
```

The code includes a minor variation—that is, instead of initializing the $A_i/Y/X$ with the values corresponding to $\theta_0$, they are initialized outside the loop as $0/0/K_n$. At the end of the first iteration, they correspond to the values for $\theta_0$. As shown, the CORDIC algorithm for calculating sin and/or cos functions involves shift operators (») and addition/subtraction operators (+/−) but without multiplication operators. Thus, the CORDIC algorithm can be implemented in small footprint circuits such as FPGA circuits.

Some implementations may use a double rotation $2\theta_i$ rather than a single rotation $\theta_i$. In double rotation, instead of adding $\pm\theta_i$, each step adds $\pm 2\theta_i$.

$$\sin(x+\delta_i 2\theta_i)=\sin(x)\cos(\delta_i 2\theta_i)+\cos(x)\sin(\delta_i 2\theta_i)$$

$$\cos(x+2\delta_i\theta_i)=\cos(x)\cos(2\theta_i)-\sin(x)\sin(\delta_i 2\theta_i)$$

After expansion $$\sin(x+2\theta_i)=\sin(x)[\cos^2(\theta_i)-\sin^2(\theta_i)]+\cos(x)2\delta_i\sin(\theta_1)\cos(\theta_i)$$

$$\cos(x+2\theta_i)=\cos(x)[\cos^2(\theta_i)-\sin^2(\theta_i)]-\sin(x)2\delta_i\sin(\theta_1)\cos(\theta_i)$$

Rearranging and factoring provides $$\sin(x+2\theta_i)=\cos^2(\theta_i)[\sin(x)+\delta_i 2\tan(\theta_i)\cos(x)-\tan^2(\theta_i)\sin(x)]$$

$$\cos(x+2\theta_i)=\cos^2(\theta_i)[\cos(x)-\delta_i 2\tan(\theta_i)\sin(x)-\tan^2(\theta_i)\cos(x)]$$

Expanding $\tan(\theta_i)$ provides $$\sin(x+2\theta_i)=\cos^2(\theta_i)[\sin(x)+\delta_i\cos(x)/2^{i-1}-\sin(x)/2^{2i}]$$

$$\cos(x+2\theta_i)=\cos^2(\theta_i)[\cos(x)-\delta_i\sin(x)/2^{i-1}-\cos(x)/2^{2i}]$$

The recurrence relationship for the double rotation is:

$$X_i=X_{i-1}+\delta_i Y_{i-1}/2^{i-1}-X_{i-1}/2^{2i}$$

$$Y_i=Y_{i-1}-\delta_i X_{i-1}/2^{i-1}-Y_{i-1}/2^{2i}$$

In this case, $\alpha_n=\Sigma_{i=0}{}^n\delta_i 2\theta_i$ and $K_n=\Pi_{i=0}{}^n\cos^2(\theta_i)$.

The code for implementing sin/cos using double rotation CORDIC is

```
sincos(A)
  Y=0
  X=Kn
  ai=0
  for(i=0; i<n; i++)
    if(ai<A)
      Y'=Y+((X«1)»i)-(Y»(2*i))
      X'=X-((Y«1)»i)-(X»(2*i))
      ai=ai+2*theta[i]
    else
      Y'=Y-((X«1)»i)-(Y»(2*i))
      X'=X+((Y«1)»i)-(X»(2*i))
      ai=ai-2*theta[i]
    Y=Y'
    X=X'
  return (Y,X)
``` where $K_n$ in this code is the product of the squares of the cosines.

$\cos(\theta_i)$ may be calculated as follows:

$$\cos(\theta_i)=1/\sqrt{1+2^{-2i}}$$

$$1/\cos^2(\theta_i)=1+2^{-2i}$$

As to the calculation of $\sin^{-1}(v)$ using CORDIC, the algorithm may choose a series of $\delta_i$ to build $\alpha_n$ such that $\sin(\alpha_n)$ approximates v. The algorithm is to choose + or − for $\delta_{i+1}$ based on whether the $\sin(\alpha_i)$ is less than v or not. To compute $X_i$ and $Y_i$ instead of $\sin\alpha_i$ and $\cos\alpha_i$, this approach may need to be modified to evaluate:

$$\sin(\alpha_i)<V\equiv K_i X_i<v\equiv X_i<v/K_i$$

Now, let $v_i=v/K_i$. In that case, the following recurrence for double rotation CORDIC) can be use.

$$v_i=v/K_i=v_{i-1}/\cos^2(\theta_i)=v_{i-1}(1/\cos^2(\theta_i))$$

Note that for the single rotation CORDIC, the $1/\cos^2(\theta_i)$ term would be replaced by $1/\cos(\theta_i)$, which would need a multiplication to implement. In the double rotation CORDIC, the recurrence for $v_i$ can be simplified as $$v_i=v_{i-1}(1+2^{-2i})$$

that can be implemented using a shift and add.

The code for arcsin is:

```
arcsin(V)
  Y=0
  X=1
  ai=0
  for(i=0; i<n; i++)
    if(Y<V)
      Y'=Y+((X«1)»i)-(Y»(2*i))
      X'=X-((Y«1)»i)-(X»(2*i))
      ai=ai+2*theta[i]
    else
      Y'=Y-((X«1)»i)-(Y»(2*i))
      X'=X+((Y«1)»i)-(X»(2*i))
      ai=ai-2*theta[i]
    Y=Y'
    X=X'
    V=V+(V»(2*i))
  return ai
```

Correspondingly, the arccos of an input can be computed from the arcsin by using the relation:

$$\cos^{-1}x=\pi/2-\sin^{-1}x$$

It is possible to use the CORDIC infrastructure to compute $\tan^{-1}(v)$. The standard approach is to initialize X to v and Y to 1, and then force X to 0. This results in the following code:

```
a tan(V)
  Y=1
  X=V
  ai=0
  for(i=0; i<n; i++)
    if(X>0)
      Y'=Y+((X«1)»i)-(Y»(2*i))
      X'=X-((Y«1)»i)-(X»(2*i))
      ai=ai+2*theta[i]
    else
      Y'=Y-((X«1)»i)-(Y»(2*i))
      X'=X+((Y«1)»i)-(X»(2*i))
      ai=ai-2*theta[i]
    Y=Y'
    X=X'
    V=V+(V»(2*i))
  return ai
```

While the initial values are set as Y=1 and X=V, they are not limited to these initial values. In practice, any initial values that follow the relation of Y/X=tan(v) may work. Alternatively, the initial values of X and Y can be set so that X/Y=tan(v), and then return π/2−ai.

The above sections include description of fixed-point CORDIC. In a fixed-point implementation, there are a fixed number of bits after the radix point, limiting the number of bits of precision available. If there are N bits after the radix point, the granularity of number that can be represented is $2^{-N}$. This generally means that $\alpha^{N+1}$ can be an exact representation of the number, resulting in very good numerical evaluation of the trigonometric functions described above. Thus only a small number (N) of steps of the recurrence needs to be evaluated, depending on the number of bits used for the precision.

Compared to the fixed-point number representation, the floating-point number representation, however, includes an exponent that can be very small such as $2^{-126}$ for non-denormal IEEE single precision floating-point numbers or $2^{-1022}$ for double precision floating-point numbers. The smallest granularity that can be represented is so small that it would require a very large number of steps of the recurrence to be evaluated if the fixed-point CORDIC is used to evaluate the trigonometric functions with a floating-point input value. On the other hand, if only a small number of bits are used to represent the small floating-point number, the relative error can be very large although the absolute error can be small. For example, if 31 bits (based $2^{-31}$) is used to represent a floating-point number in the level of $2^{-55}$ base, the relative error can be as high as $2^{24}$ which may mean that the all the bits in the mantissa of the evaluated trigonometric functions are incorrect. Thus, it is not hardware-efficient or accurate to apply the fixed-point CORDIC algorithm directly to floating-point number representations when the input value is very small.

Instead of the directly application of fixed-point CORDIC to floating-point number presentations, implementations of the disclosure first determine whether the floating-point input value is small. Responsive to determining that the floating-point input value is not small, implementations may employ the CORDIC algorithm to calculate trigonometric functions. Responsive to determining that the floating-point input value is small, implementations may employ an approximation approach to calculate trigonometric functions. Thus, the values of trigonometric functions can be evaluated in an adaptive manner. One implementation of the disclosure may use the first term of the Taylor series expansions as the approximation of the trigonometric functions with a small floating-point input. These approximations based on the first terms of the Taylor series expansions for small input value $\alpha$ are:

$\sin(\alpha) \sim \alpha$ $\cos(\alpha) \sim 1 - \alpha^2$ $\sin^{-1}(\alpha) \sim \alpha$ $\tan^{-1}(\alpha) \sim \alpha$ where the input value $\alpha$ is measured in terms of radians. The trigonometric functions of large input values may be calculated using the CORDIC algorithm. In one implementation, instead of just the first term of the Taylor series, the approximation for the small input value $\alpha$ may also include the second term (or more terms) of the Taylor series. Because the input value is a small floating-point number, the multiplication result of the higher-order terms (second order or above) may be represented using fewer bits (e.g., 8 bits) while the multiplication circuits for the small floating-point input values can be a low-bit (e.g., 4 or 5 bits) multiplication circuits which are cheaper to implement compared to the standard 16-bit or 32-bit multiplication circuits.

Compared to the fixed-point number representation, the floating-point number representation, however, includes an exponent that can be very small such as $2^{-126}$ for non-denormal IEEE single precision floating-point numbers or $2^{-1022}$ for double precision floating-point numbers. The smallest granularity that can be represented is very small that it would require a very large number of steps of the recurrence to be evaluated compared to the fixed-point number presentation. Thus, it is not efficient to apply the fixed-point CORDIC algorithm directly to floating-point number representations when the input value is very small. The adaptive calculation of trigonometric functions may allow hardware-efficient implementations of the trigonometric functions.

FIG. 1 illustrates a flow diagram of a method 100 for adaptively calculating a trigonometric function according to an implementation of the disclosure. Referring to FIG. 1, method 100 may be implemented on a processing device such as a hardware processor or an accelerator circuit. At 102, the method 100 may include identifying a floating-point input value to a trigonometric function. The floating-point input value can be a variable defined in a program as a floating-point value. The trigonometric function can be any one of sin, cos, arcsin, arccos, or arctan function. For sin/cos functions, the input value may be modulated to a corresponding value in the first quadrant. The input values to the arcsin/arccos are defined in the range of [−1, 1]. For arctan, if the input value is very large, an inverse of the input value may be used for calculation. If the input value is close to one (1), the approximation is $\tan^{-1}(\alpha) \sim \pi/2$.

At 104, the method may include determining whether the input value is a small number. The determination of whether the input value is small may be based on one or more factors including, but not limited to, estimated absolute errors, estimated relative errors, types of the trigonometric functions, types of floating-point number representations, or the hardware constraints. In one implementation, the determination of whether the floating-point input value can be based on an estimated absolute error. For example, a target bound of the estimated absolute error may be represented by a number (N) of bit (e.g., $2^{-N}$). Thus, a floating-point input value smaller than the target bound of the estimated absolute error (e.g., $2^{-N}$) is determined to be small; a floating-point input value that is in the range or larger than the target bound is determined to be not small.

Similarly, in another implementation, the determination of whether the floating-point input value can be based on an estimated relative error. For example, a target bound of the estimated relative error. Current implementations of CORDIC are fixed-point algorithms. An n-step CORDIC algorithm may have a residual error of $k2^{-n}$. For floating-point number representations, however, the residual errors are in a range that is determined by the size of the exponent. In the case of single-precision numbers, the exponent can be as small as $2^{-149}$. Covering this range using purely a CORDIC approach would require approximately 149 steps. Using the first term of Taylor expansion as an approximation to a small input value may reduce the complexity of the calculation.

As discussed above, instead of performing the CORDIC algorithm, the first term of Taylor expansion can be used as the approximation of a trigonometric function for small input values. The residual errors for using the first term of Taylor expansions to approximate the trigonometric functions depend on the function themselves. For example, for $\sin(x)$ functions, the residual errors are bound by $(x^3/3!)$; for $\cos(x)$ functions, the residual errors are bounded by $(x^4/4!)$. Thus, the trigonometric functions may determine the bounds of the residual errors of different approximations. These bounds of the residual errors may be used to determine the bounds of absolute errors or relative errors, thereby determining whether the input value is small.

Using the sin with single-precision floating-point input value as an example, only 24 significant bits are needed. If the approximation used is $\sin(\theta) \sim \theta$, the relative error is $\theta^2/6$. If $\theta \leq 2^{-11}$ then the relative error is less than $2^{-24}$. So the approximation will differ by at most the least significant bit. This reduces the problem for CORDIC to be accurate for input values greater than $2^{-11}$. If the input is $2^{-10}$, then the result is approximately $2^{-10}$. If the result is to be in single precision format, then the least significant bit is $2^{-34}$. This means that approximately 34 CORDIC steps will be necessary to reduce the error to the least significant bit.

If an error in the last 2k+1 bits is acceptable, then for single precision, the cutoff between a small value and a non-small value can be set at $2^{-11+k}$. This will keep the error in the desired range. Then, the CORDIC algorithm only needs 34-3k steps—the smallest result generated is $2^{-11+k}$ and the smallest bit position which needs to be accurate is at 24-2k. So, a 5 least significant bit (LSB) error is acceptable, the cutoff can be set at $2^{-9}$, and the CORDIC algorithm needs at most 25 steps.

Responsive to determining that the input value is a small value, at 106, the method may include using an approximation of the trigonometric function with respect to the small input value. In one implementation, the approximation to the trigonometric functions with a small floating-point input value is the first term of Taylor expansion. These approximations based on the first terms of the Taylor series expansions for small input value $\alpha$ are:

$$\sin(\alpha) \sim \alpha$$

$$\cos(\alpha) \sim 1 - \alpha^2$$

$$\sin^{-1}(\alpha) \sim \alpha$$

$$\tan^{-1}(\alpha) \sim \alpha$$

where the input value $\alpha$ is measured in terms of radians.

Customarily, when dealing with trigonometric functions, angles are given in units of radians. However, using radians may require taking the modulus with respect to $2\pi$ to remove the periodicity for computing functions such as sin/cos, and then, possibly require further dividing by $\pi/2$ to identify the quadrant and to constrain the input to one quadrant. This can be computationally expensive. An alternative is to express any angles in terms of multiples of $\pi/2$ (or of some other rational multiple of $\pi$, such as $\pi$ or $2\pi$). If angles are expressed in multiples of $\pi/2$, then:

the fractional part is the angle within a quadrant;
the modulus of the integer part by four (4) determines the quadrant.

Adopting this approach may greatly simplify the handling of angles for trigonometric functions. The Taylor series approximations work for small angles expressed in radians. If angles are expressed as multiples of $\pi/2$, then:

$$\sin(\alpha) \sim \alpha\pi/2$$

$$\cos(\alpha) \sim 1 - \alpha^2\pi^4/4$$

$$\sin^{-1}(a) \sim 2\alpha/\pi$$

$$\tan^{-1}a \sim 2\alpha/\pi$$

Responsive to determining that the input value is not a small value, at 108, the method may include using the CORDIC algorithms to calculate the trigonometric functions with respect to the input value, where the CORDIC algorithms may have been implemented as circuit logic blocks (e.g., on an FPGA circuit board) including shift operator circuit and/or addition operator circuit. Thus, implementations of the disclosure may reuse the circuit logic blocks implementing CORDIC algorithms and save the circuit area.

Standard IEEE floating-point representations include representations of special values such as +/−Infinity, signaling and quiet NaNs, and denormals. In addition, IEEE floating-point representations can identify certain exceptions, specifically INVALID, OVERFLOW, UNDERFLOW, DIVIDE-BY-ZERO and INEXACT. The table below summarizes the actions recommended for the operations.

TABLE 1

| Operation | Input | Result | Exception |
|---|---|---|---|
| sin/cos | ±Infinity | quiet NaN | INVALID |
| arcsin | >1.0, +Infinity | quiet NaN | INVALID |
|  | <−1.0, −Infinity | quiet NaN | INVALID |

Figure 2:
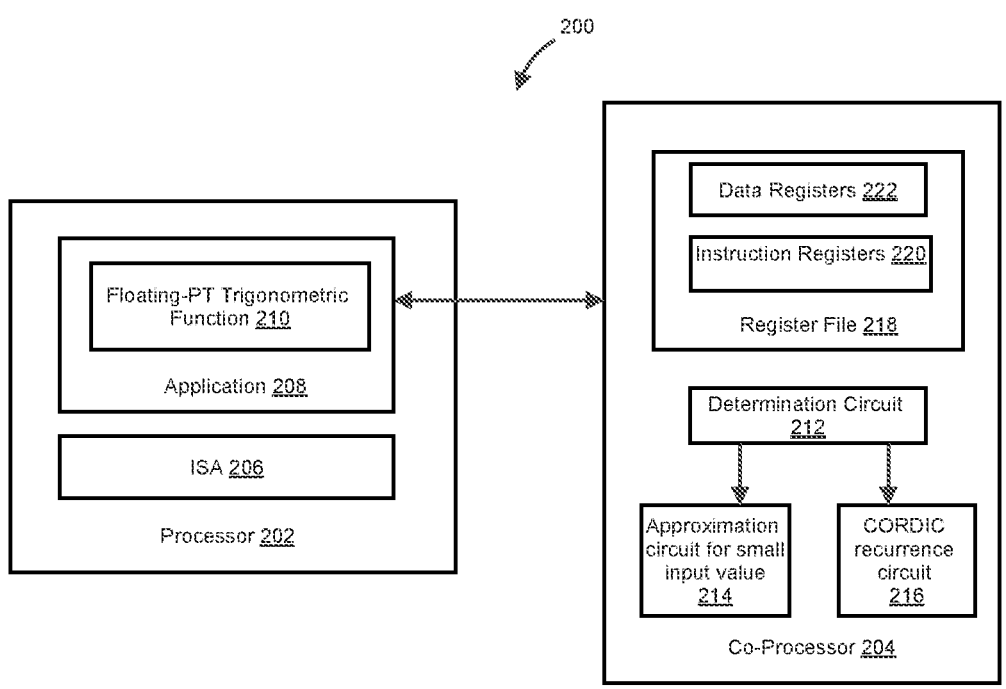
FIG. 2 illustrates a system for performing the adaptive calculation of trigonometric functions according to an implementation of the disclosure.

MAX_EXP, MIN_DENORM depend on format; for single precision 128/−149 respectively FIG. 2 illustrates a system 200 for performing the adaptive calculation of trigonometric functions according to an implementation of the disclosure. As shown in FIG. 2, system 200 may include a hardware processor 202 and optionally, a co-processor 204. Processor 202 can be a central processing unit (CPU), a graphic processing unit (GPU), or any suitable types of processing devices. Processor 202 may include an instruction execution pipeline (not shown), a register file (not shown), and circuits implementing instructions specified according to an instruction set architecture (ISA) 206. The instructions may include instructions for adaptively calculating floating-point trigonometric functions. In one implementation, processor 202 may execute an application 208 using the execution pipeline. The application may include executable code of a program designed to solve a practical problem such as a medical imaging problem or a machine learning problem. Application 208 when executed may include calls to trigonometric functions 210.

In one implementation, system 200 may provide a co-processor (or accelerator circuit) 204 with designated circuits to support the adaptive calculation of floating-point trigonometric functions 210. Co-processor 204 can be part of processor 202 or a separate logic circuit communicatively connected to processor 202. For example, co-processor 204 can be an accelerator circuit implemented on a FPGA board to accelerate the calculation of trigonometric functions. Co-processor 204 may include a register file 218, a determination circuit 212, an approximation circuit 214, and a CORDIC recurrence circuit 216.

Register file 218 may include instruction registers 220 and data registers 222. Instruction registers 220 may receive instructions from the execution pipeline of processor 202 executing floating-point trigonometric function 210 and store the instructions therein. In one implementation, the instructions may include trigonometric calculation instructions for evaluating trigonometric functions with respect to an input value. Data registers 222 may store input values and output values associated with a corresponding a trigonometric calculation function instruction. In one implementation, data registers 222 may include floating-point data registers that may store floating-point input values and floating-point output values. The execution pipeline of processor 202 may store the input values associated with a trigonometric calculation function in data registers 222 and retrieve the results of executing the trigonometric calculation function from data registers 222.

Determination circuit 212 may identify an instruction for calculating a trigonometric function from instruction register 220 and a corresponding input value associated with the instruction from data register 222. Responsive to identifying the instruction including the input value, determination circuit 212 may parse the instruction and the input value, and further determine whether the input value is a small value. As discussed above, the determination circuit 212 may determine whether the input value is a small value based on one or more factors including, but not limited to, estimated absolute errors, estimated relative errors, types of the trigonometric functions, types of floating-point number representations, and the hardware constraints. Determination circuit 212 may include a switch circuit (e.g., a multiplexer) that may route the input value based on the determination of whether the input value is a small value.

Responsive to determining that the input value is a small value, determination circuit 212 may route the input value to approximation circuit 214 to calculate an approximation of the trigonometric function. The trigonometric functions supported by approximation circuit may include sin, cos, $\sin^{-1}$, $\tan^{-1}$. For example, approximation circuit 214 may include logic circuits that implement the first term Taylor approximation of trigonometric functions sin, cos, $\sin^{-1}$, $\tan^{-1}$, respectively. The first term Taylor approximations of trigonometric functions are described above. The output of approximation circuit 214 can be the evaluation of the trigonometric function and can be transmitted to processor 202.

Responsive to determining that the input value is not a small value, determination circuit 212 may route the input value to CORDIC recurrence circuit 216 to evaluate the trigonometric function based on the input value. CORDIC recurrence circuit 216 may include logic circuits that respectively implement CORDIC recurrence for trigonometric functions including sin, cos, $\sin^{-1}$, $\tan^{-1}$. In particular, CORDIC recurrence circuit 216 may include shift circuits and addition circuit that may be combined to perform different CORDIC algorithms for trigonometric functions. The output of CORDIC recurrence circuit 216 can be the evaluation of the trigonometric function and can be transmitted to processor 202. As such, co-processor 204 may implement in hardware circuits the adaptive calculation of trigonometric functions in a hardware efficient way.

To take into consideration of special input values as shown in Table 1, when computing one of the trigonometric functions, the method and the system may include:

Determining that the input value is a special case specified in Table 1, and applying the corresponding rules to compute the result including possibly generating an exception;

Determining that the input falls into the range where the approximation algorithm is to be used, use the approximation to compute the result;

otherwise using the CORDIC algorithm.

Using the CORDIC algorithm to compute trigonometric functions involves the following steps:

Normalizing the input to extract the number that is used as input to CORDIC, and in particular, for sin/cos functions, extracting the integer and fractional parts of the input number;

Performing N stages of the CORDIC algorithm to get approximation, where N is determined based on the number of bits representing the fractional part;

Generating the results including for sin/cos, using quadrant information to correct sign and possibly swap sin/cos results.

When the input numbers fall in the range appropriate to using CORDIC, it is possible to restrict the numbers as well as the intermediate results to fall in the range [0 . . . 4). This means that only 2 bits above the radix point are required.

Figure 3:
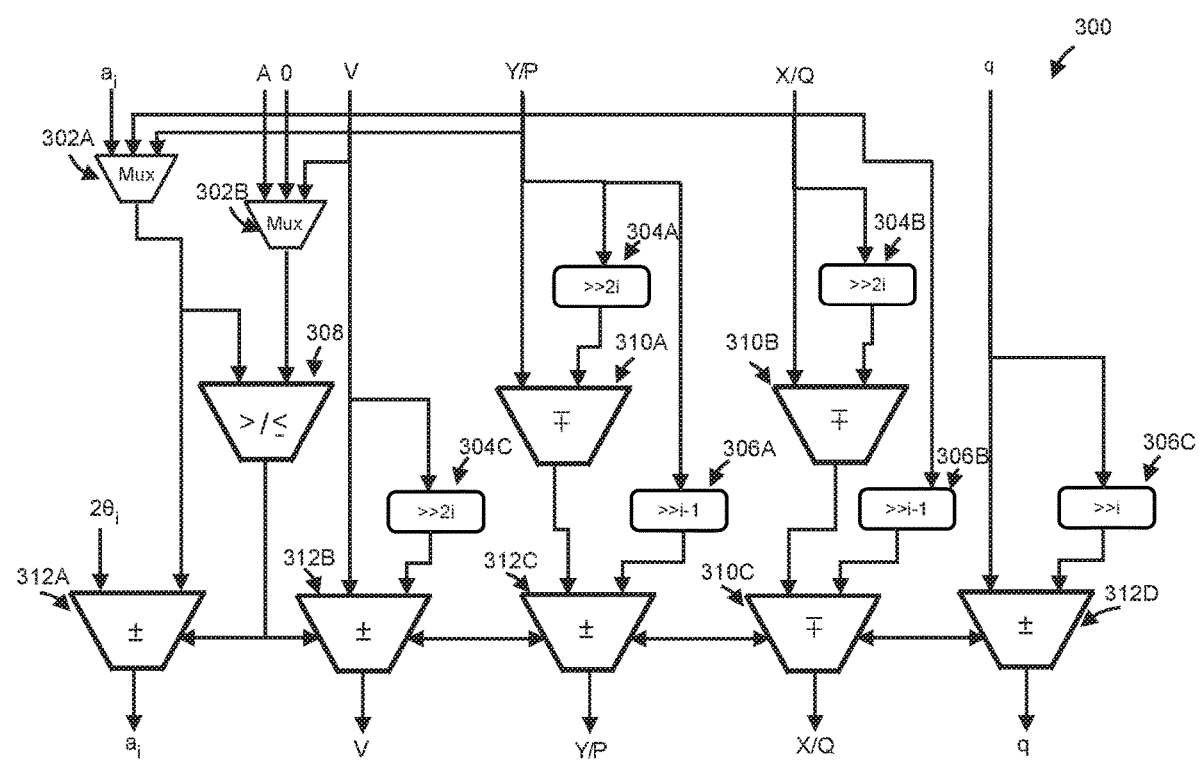
FIG. 3 shows the inner stage of the CORDIC including loops for each of the operations to be combined into a single block according to an implementation of the disclosure.

FIG. 3 shows the inner stage 300 of the CORDIC including loops for each of the operations to be combined into a single block according to an implementation of the disclosure. Depending on the trigonometric function being computed different parts of the block may be activated. Another implementation may include different hardware blocks for each of the N CORDIC stages. In yet another implementation, the CORDIC may be implemented by using one block N times. In this case, the shift values and the 2θ value will have to be selected differently for each iteration. A complex shifter, such as a barrel shifter, may be used since ~N shift values are possible.

As shown in FIG. 3, inner stage 300 may include logic circuits of multiplexers 302A, 302B, double right shifters 304A-304C, single right shifter 306A-306C, a comparator 308, subtraction/summation circuits 310A-310C, and summation/subtraction circuits 312A-312D. Inner stage 300 may perform one CORDIC recurrence for step i. The inputs to the inner stage 300 may include $a_i$, V, Y (or P), X (or Q), and q, where the selection of Y or P, X or Q depends on the function to evaluated. The first stage may also include constant values A (the base) and 0. After each recurrence interaction, the inner stage 300 may generate outputs including $a_i$, V, Y (or P), X (or Q), and q that may be used as the inputs for the next stage i+1.

Certain components of inner stage 300 may be reconfigured to implement different elementary functions and/or trigonometric functions. In particular, comparator 308 is configured to be a greater comparator (">") except for arctan function. In the arctan function case, comparator 308 is configured to be a lesser or equal comparator ("≤"). Summation/subtraction circuit 312B is configured to evaluate trigonometric functions, but is configured as a subtraction/summation circuit for the evaluation of elementary functions. Subtraction/submission circuits 310A, 310B are configured to evaluate trigonometric functions, but are configured as summation/subtraction circuits for the evaluation of elementary functions. Multiplexers 302A, 302B may select $a_i$/A for trigonometric, and select Y/V for elementary functions. The index value i for shifters 304A, 304C, 306A are sequential for trigonometric functions, but include repeating terms as described above for elementary functions.

In one implementation of the disclosure, the input value to the trigonometric functions can be IEEE single precision, double precision, quadruple precision, or octuple precision floating-point number. For a single precision implementation, the fixed-point numbers are represented with as 61 bit numbers, with a 59 bits after the (implicit) radix point.

For this implementation, the calculation of sin/cos functions may include the following:

±infinity input value results in NaN;

inputs are assumed to be multiples of π/2 to simplify the calculation;

an input value v is split into a whole number part w and a fractional number part f;

the whole number modulated by 4 (w %4) determines the quadrant in which the input value is located;

if the fractional part f is less than $2^{-9}$, the small value approximations are used f*π/2 is used for sin $1-f^2*\pi^2/4$ is used for cos when f>$2^{-12}$ 1 is used for cos when f≤$2^{-12}$ otherwise convert the fractional part into a fixed-point number and run the appropriate variant of CORDIC to obtain sin and cos;

convert fixed-point result generated by CORDIC back to floating-point representation;

select sign and sin/cos based on the quadrant the input value is in.

For $\sin^{-1}$ function:

out of range input value results in NaN;

special cases where input values are 1.0 and 0.0 may result in 1.0 and 0.0 respectively (results are multiples of π/2);

If the absolute value of the input |v| is less than $2^{-9}$, the small value approximation is used, generating a result |v|*2/π;

otherwise, convert |v| into a fixed-point number and calculate $\sin^{-1}(v)$ using the CORDIC;

convert fixed-point result back to floating-point;

set sign based on sign of input.

For $\tan^{-1}$ function:
  ±infinity input value results in ±1.0 (results are multiples of $\pi/2$);
  if the absolute value of the input |v| is less than $2^{-9}$, the small value approximation is used, generating a result $|v|*2/\pi$
  if |v| is greater than or equal to $2^{19}$, the result is set to 1.0;
  otherwise, convert the input value to a fixed-point number representation, and perform the $\tan^{-1}$ CORDIC calculation:
    if |v| is less than $2^0$, initial Y is set to 1.0, X is set to |v|; otherwise initial Y is set to $2^{-exp-1}$, X is set to $|v|*2^{-exp-1}$, where exp is the exponent of v in floating-point format;
  convert the fixed-point result back to floating-point number representation;
  set sign based on sign of input.

Implementations of the disclosure provide an adaptive calculation of trigonometric functions with floating-point input values using an approximation function and the CORDIC algorithm. Implementations may leverage a common CORDIC circuit block to reduce the circuit area. For each type of trigonometric function, the adaptation of CORDIC to floating-point includes identifying alternative approximation techniques that can be used in each of these cases to deal with ranges of inputs that may be costly if computed using CORDIC algorithm alone.

While the disclosure has been described with respect to a limited number of implementations, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as can be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' capable of/to,' and or 'operable to,' in one implementation, refers to some apparatus, logic, hardware, and/or element designed in such a way to enable use of the apparatus, logic, hardware, and/or element in a specified manner. Note as above that use of to, capable to, or operable to, in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example, the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform implementations of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the present disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

What is claimed is:

1. An accelerator circuit, comprising:
    a register file comprising:
        instruction registers to store an instruction for evaluating a trigonometric function; and
        data registers comprising a first data register to store a floating-point input value associated with the instruction;
    a determination circuit communicatively coupled to the register file, to:
        identify the trigonometric function and the floating-point input value associated with the instruction; and
        determine whether the floating-point input value is in a small value range;
    an approximation circuit communicatively coupled to the determination circuit, to:
        responsive to determining that the floating-point input value is in the small value range, receive the floating-point input value and calculate an approximation of the trigonometric function with respect to the floating-point input value; and
    a coordinate rotate digital computer (CORDIC) circuit, to:
        responsive to determining that the floating-point input value is outside the small value range, receive the floating-point input value and calculate the trigonometric function with respect to the floating-point input value using CORDIC recurrences, wherein each of the CORDIC recurrences comprises at least one of a single rotation operation with respect to the floating-point input value or a double rotation operation with respect to the floating-point input value; and
    to calculate the trigonometric function with respect to the floating-point input value using CORDIC recurrences, the CORDIC circuit is further to:
        split the floating-point input value into a whole number part and a fractional number part;
        determine, based on the whole number part, a quadrant in which the floating-point input value is locate;
        convert the fractional number part into a fixed-point number;
        calculate, using the CORDIC recurrences, the trigonometric function with respect to the fixed-point number to generate a fixed-point result;
        convert the fixed-point result into a floating-point result;
        determine a sign based on the quadrant and the trigonometric function; and
        store the sign and the floating-point result in a third data register of the data registers.

2. The accelerator circuit of claim 1, wherein the trigonometric function comprises at least one of a sine function (sin), a cosine function (cos), an inverse sine function (arcsin), an inverse cosine function (arccos), a tangent function (tan), or an inverse tangent function (arctan).

3. The accelerator circuit of claim 1, wherein to determine whether the floating-point input value is in the small value range, the determination circuit is to determine whether the floating-point input value is in the small value range based on at least one of an estimated absolute error, an estimate relative error, a type of the trigonometric function, a type of floating-point number representation used for the floating-point input value, or a hardware constraint by the CORDIC circuit.

4. The accelerator circuit of claim 1, wherein the floating-point input value is encoded using at least one of an IEEE half-precision floating-point number representation, an IEEE single-precision floating-point number representation, an IEEE double-precision floating-point number representation, an IEEE quadruple precision floating-point number representation, or an IEEE octuple precision floating-point representation.

5. The accelerator circuit of claim 1, wherein to calculate the approximation of the trigonometric function with respect to the floating-point input value, the approximation circuit is to:
calculate the approximation of the trigonometric function using a first term and optionally a second term of a Taylor expansion of the trigonometric function; and
store the approximation in a second data register of the data registers.

6. The accelerator circuit of claim 1, wherein the floating-point input value represents an angle measured as a multiple of $\pi/2$.

7. A computing system, comprising:
a storage device to store a floating-point input value;
a processor to execute an application comprising an instruction for evaluating a trigonometric function with respect to the floating-point input value; and
an accelerator circuit, communicatively coupled to the processor, comprising:
a determination circuit to:
receive the instruction and the floating-point input value; and
based on whether the floating-point input value is in a small value range, employ an approximation circuit or a coordinate rotate digital computer (CORDIC) circuit to evaluate the trigonometric function with respect to the floating-point input value;
wherein to calculate the trigonometric function with respect to the floating-point input value using CORDIC recurrences, the CORDIC circuit is further to:
split the floating-point input value into a whole number part and a fractional number part;
determine, based on the whole number part, a quadrant in which the floating-point input value is locate;
convert the fractional number part into a fixed-point number;
calculate, using the CORDIC recurrences, the trigonometric function with respect to the fixed-point number to generate a fixed-point result;
convert the fixed-point result into a floating-point result;
determine a sign based on the quadrant and the trigonometric function; and
store the sign and the floating-point result in a third data register of the data registers.

8. The computing system of claim 7, wherein the accelerator circuit further comprises:
the approximation circuit to:
responsive to determining that the floating-point input value is in the small value range, receive the floating-point input value and calculate an approximation of the trigonometric function with respect to the floating-point input value; and
the CORDIC circuit to:
responsive to determining that the floating-point input value is outside the small value range, receive the floating-point input value and calculate the trigonometric function with respect to the floating-point input value using CORDIC recurrences, wherein each of the CORDIC recurrences comprises at least one of a single rotation operation with respect to the floating-point input value or a double rotation operation with respect to the floating-point input value.

9. The computing system of claim 7, wherein the trigonometric function comprises at least one of a sine function (sin), a cosine function (cos), an inverse sine function (arcsin), an inverse cosine function (arccos), a tangent function (tan), or an inverse tangent function (arctan).

10. The computing system of claim 7, wherein to determine whether the floating-point input value is in a small value range, the determination circuit is to determine whether the floating-point input value is in the small value range based on at least one of an estimated absolute error, an estimate relative error, a type of the trigonometric function, a type of floating-point number representation used for the floating-point input value, or a hardware constraint by the CORDIC circuit.

11. The computing system of claim 7, wherein the floating-point input value is encoded using at least one of an IEEE half-precision floating-point number representation, an IEEE single-precision floating-point number representation, an IEEE double-precision floating-point number representation, an IEEE quadruple precision floating-point number representation, or an IEEE octuple precision floating-point representation.

12. The computing system of claim 7, wherein to calculate an approximation of the trigonometric function with respect to the floating-point input value, the approximation circuit is to:
calculate the approximation of the trigonometric function using a first term and optionally a second term of a Taylor expansion of the trigonometric function; and
store the approximation in a second data register of a first data register.

13. The computing system of claim 7, wherein the floating-point input value represents an angle measured as a multiple of $\pi/2$.

* * * * *